(12) United States Patent
Hoffis

(10) Patent No.: US 7,491,268 B2
(45) Date of Patent: Feb. 17, 2009

(54) SLAG CEMENT

(75) Inventor: Lawrence L. Hoffis, Carmel, IN (US)

(73) Assignee: Slagcem LLC, Zionsville, IN (US)

( * ) Notice: Subject to any disclaimer, the term of this patent is extended or adjusted under 35 U.S.C. 154(b) by 412 days.

(21) Appl. No.: 11/108,187

(22) Filed: Apr. 18, 2005

(65) Prior Publication Data

US 2006/0230986 A1 Oct. 19, 2006

(51) Int. Cl.
*C04B 7/14* (2006.01)
(52) U.S. Cl. .................. 106/714; 106/738; 106/789; 106/791
(58) Field of Classification Search ............... 106/714, 106/738, 789, 791
See application file for complete search history.

(56) References Cited

U.S. PATENT DOCUMENTS

| | | | | |
|---|---|---|---|---|
| 2,125,520 | A | * | 8/1938 | Parker et al. |
| 2,600,515 | A | * | 6/1952 | Mooser |
| 4,174,974 | A | * | 11/1979 | Fondriest ............ 106/735 |
| 4,761,183 | A | | 8/1988 | Clarke |
| 5,411,092 | A | | 5/1995 | Cowan |
| 5,494,515 | A | * | 2/1996 | Young |
| 5,516,357 | A | * | 5/1996 | Edlinger et al. |
| 5,766,297 | A | * | 6/1998 | Piniecki |
| 5,976,243 | A | * | 11/1999 | Oates et al. |
| 6,645,290 | B1 | | 11/2003 | Barbour |
| 6,740,157 | B2 | * | 5/2004 | Piniecki |
| 6,776,839 | B2 | | 8/2004 | Ko |
| 2003/0205175 | A1 | * | 11/2003 | Wiedenhoft et al. |

OTHER PUBLICATIONS

Answer 103 of 132 of CA on STN BE 869100 (Nov. 16, 1978) abstract only.*
Answer 99 of 132 of CA on STN JP 54069137 A (Jun. 2, 1979) Hirayama et al. abstract only.*
Answer 96 of 132 of CA on STN "Effect of limestone as a filler on properties of concrete made of blast furnace slag cement" Iwabuchi et al., Semento Gijutsu Nenpo (1978), (32), 297-300.*
Answer 94 of 132 of CA on STN Manufacture of high elary strength slag cement Akiyama et al. Semento Gijutsu Nenpo (1980), (34), 98-101.*
Answer 83 of 132 of CA on STN "Effect of superfine granulated blast furnace slag and limestone on properties of blast furnace slag cement" Harada et al. Semento Gijutsu Nenpo (1986), (40), 67-70.*
Answer 80 of 132 of CA on STN "treatment of slag with limestone for volcanic ash cement manufacture", Chen CN 87103506 A (Nov. 18, 1987) abstract only.*
Answer 79 of 132 of CA on STN "Reactivity and burnability of raw mixes made by crystallized blast furnace slags part II" Puertas et al., ZKG Int'l Edition B (1988), 41(12), 628-31. abstract only.*
Answer 74 of 132 of CA on STN JP 02192440 (Jul. 30, 1990) Akeki et al. abstract only.*
Answer 43 of 132 of CA on STN JP 2001048614 A (Feb. 20, 2001) Akiyama et al. abstract only.*
Answer 30 of 132 of CA on STN "Hydration characteristics of lime slag-cement", Heikal et al., Mansoura Science Bulletin A: CHemistry (2001), 28(1 Supp2), 195-215. abstract only.*
Answer 13 of 132 of CA on STN KR 20001038096 (May 15, 2001) Sho et al. abstract only.*
Answer 10 of 132 of CA on STN KR 2003008264 (Jan. 25, 2003) Kim et al. abstract only.*
Derwent 1979-01267 B JP 78044941 B (Dec. 2, 1978) Nippon Steel abstract only.*
Derwent 1996-0112460 JP 08012387 A (Jan. 16, 1996) abstract only. Masuda et al.*
Derwent 2001-614643 KR 2001038096 (Sho et al.) abstract only.*
"Slag Cement", Slag Cement Association, © 2002, 5 pages.
"Blast Furnace Slag", http://www.tfhrc.gov/hnr20/recycle/waste/bfs3.htm, Nov. 11, 2004, 3 pages.

* cited by examiner

*Primary Examiner*—Paul Marcantoni
(74) *Attorney, Agent, or Firm*—Maginot, Moore & Beck LLP

(57) ABSTRACT

A slag cement includes ground granulated blast furnace slag and ground limestone combined in a predetermined weight ratio. Limestone and granulated blast furnace slag (GBFS) are fed to a grinding apparatus in a ratio of about 3-5% limestone by weight. The limestone is a cheaper raw material than the GBFS, resulting in a reduction in production costs for the slag cement. Moreover, the addition of limestone to the GBFS surprisingly results in improved compressive strength.

9 Claims, No Drawings

SLAG CEMENT

BACKGROUND OF THE INVENTION

The present invention relates to slag cement and more particularly to slag cement composed of ground granulated blast furnace slag.

Blast furnace slag is the non-metallic by-product of iron production, generally consisting of silicon, calcium, aluminum, magnesium and oxygen. When iron is manufactured using a blast furnace, two products collect in the hearth—molten iron and slag. The slag floats on top of the iron and is skimmed off to be fed to a granulator. In the granulator the molten slag is rapid quenched with water. The resulting granules are essentially glassy, non-metallic silicates and aluminosilicates of calcium. The glass content of the slag generally determines its cementitious character or suitability for use in a hydraulic cement—the higher the glass content the greater the cementitious properties.

Significant quantities of this blast furnace by-product are produced annually. Disposal of the blast furnace slag had been problematic until subsidiary uses for the slag were developed. For instance, granulated blast furnace slag (GBFS) may be added to cement clinker and calcium sulfate and inter-ground to create a modified portland cement. GBFS may also be added to the raw material feed stream for a cement kiln resulting in cement clinker. Where the GBFS is vitreous, additional yields of clinker have been obtained using the invention disclosed in U.S. Pat. No. 6,740,157, entitled "Method for cement clinker production using vitrified slag", which issued on May 25, 2004, to the assignee of the present invention.

Ground granulated blast furnace slag (GGBFS) has been frequently used to replace a portion of portland cement in a concrete mixture. Blended cement (ASTM Type IS) is produced by inter-grinding and/or blending portland cement with the GGBFS. The GGBFS synergistically works with the portland cement to increase strength, reduce permeability, improve resistance to chemical attack and inhibit rebar corrosion.

Ground granulated blast furnace slag (GGBFS) has also been used as a separate cement component in its own right. Slag cement is a hydraulic binder, like portland cement, that reacts with water to form cementitious material (calcium-silicate hydrate). Grinding the GGBFS reduces the particle size to a cement fineness suitable for use as a hydraulic cement, which is typically less than 3500 $cm^2/g$. In some cases, additives may be introduced to improve the physical properties of the slag cement, such as certain aluminosilicates, like fly ash, sulfate, and certain superliquifiers, such as naphthalene sulfonate.

Addition of GGBFS to portland cement in a blended cement and the replacement of portland cement with GGBFS take advantage of the energy invested at the foundry in the slag producing process, rather than at the cement mill. Grinding slag for cement replacement requires only about 25% of the energy needed to manufacture an equivalent amount of portland cement through the cement clinkering and milling process.

Blast furnace slag typically has a moisture content of 10-12% when it is received from a foundry. The slag is stockpiled, sometimes for several months, before being prepared for use as a clinker replacement or as slag cement. Often, the moisture content of this stockpiled slag reaches 20-22%. Thus, before the slag is used in a cement application it is first dried in a dryer operated at about 350° F. The energy required to dry the stockpiled slag results in an increase in the cost of the slag. The increased slag cost is still below the cost of producing a comparable amount of portland cement clinker. Although the slag cement is cheaper to produce than portland cement, customer acceptance of slag cement has stunted its usage, especially in the United States. From an economic standpoint, slag cement is not sufficiently less expensive than portland cement to drive the industry toward more slag cement usage, even though slag cement is acceptable for most cement applications.

Consequently, what is needed is a way to further reduce the cost of slag cement. This cost reduction should be accomplished without the need for significantly modifying existing slag cement processing equipment or necessitating the purchase of additional capital equipment. Thus, the cost reduction for the slag cement should be accomplished in a way that does not itself result in meaningful additional expense to the cement producer.

DESCRIPTION OF THE PREFERRED EMBODIMENTS

While the invention is susceptible to various modifications and alternative forms, a specific embodiment thereof will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

The present invention contemplates the addition of a cheaper material to blast furnace slag to form a slag cement that has comparable, and in some cases, superior physical properties than traditional slag cement. Thus, in accordance with a preferred embodiment of the invention, ground limestone is combined with the blast furnace slag. Limestone is substantially cheaper per ton than either blast furnace slag or portland cement. Indeed, limestone is typically less than half the cost of either cementitious material. Moreover, limestone is generally available from significant deposits across North America.

In accordance with the present invention, the limestone can be, added to the blast furnace slag at any stage in the slag processing. Most preferably, the limestone is added to granulated blast furnace slag (GBFS) after it has been dried. Limestone has a very low moisture content that is typically within the acceptable range (1-1½%) for the final slag cement product, so there is usually no need to dry the limestone. Where the limestone replaces a comparable amount of slag in a cement composition, the cost savings is manifested not only in the cheaper cost of the limestone, but also in the reduced energy requirements for drying the slag constituent.

In the most preferred embodiment, the limestone is added to the dried GBFS as the mixture is fed to a grinding apparatus so that the grinding apparatus also combines and mixes the constituents. The output of the grinding apparatus is a comminuted mixture of ground granulated blast furnace slag (GGBFS) and ground limestone. Grinding the limestone with the GBFS does not require additional energy or substantially more processing time to grind the final product to a fineness suitable for use as a cement (typically <5000 Blaine ($cm^2/g$)).

The grinding apparatus can be any apparatus known for use in grinding GBFS to an acceptable cement fineness, such as a typical ball mill. The apparatus can be provided with two feed hoppers of known design, one for each of the constituents. Alternatively, a single transfer element, such as a hopper or conveyor, can feed the raw material to the grinding apparatus, with the GBFS and limestone being separately supplied to the single transfer element, as is known in the art. Because the grinding of limestone and GBFS can occur in a single grinding application, the only new equipment to be added to the system is equipment for additional material introduction and transfer points.

The beneficial economics of adding limestone to GBFS is evident. Presently, GBFS can be obtained at a cost of $25-28 per ton. The cost of drying the GBFS to reduce its moisture content to an acceptable level is difficult to estimate, but can add $2-3 per ton to the total cost of the GBFS. The cost of limestone is presently about $11-14 per ton, and no additional cost for drying is incurred. Grinding the GBFS-limestone composition does not require any additional processing or associated cost above that incurred in grinding GBFS into GGBFS. Thus, a savings of $13-20 can be realized for each ton of limestone substituted for a ton of GBFS in the production of slag cement.

While these cost savings may be anticipated, the combination of limestone with GBFS produces unanticipated performance improvements. These unexpected performance improvements are believed to be related to the weight proportion of limestone to GGBFS in the slag cement product. The following table illustrates the improvement in compressive strength achieved by the addition of ground limestone to GGBFS.

| % added by wt. | Compressive Strength (psi) | | |
| --- | --- | --- | --- |
|  | 3 day | 7 day | 28 day |
| 0 | 2,610 | 4,310 | 6,230 |
| 1 | 2,720 | 4,460 | 6,380 |
| 2 | 2,750 | 4,400 | 6,390 |
| 3 | 3,180 | 4,690 | 6,690 |
| 4 | 2,990 | 4,590 | 6,270 |
| 5 | 3,020 | 4,720 | 6,420 |
| 6 | 2,800 | 4,680 | 6,210 |
| 10 | 3,110 | 4,870 | 6,610 |
| 15 | 2,750 | 4,310 | 5,690 |
| 20 | 2,620 | 4,170 | 5,390 |

As the above data suggests, long term compressive strength of the slag cement improves as the percent by weight of limestone increases to about 10% (combined with 90% by weight of GGBFS). Greater percentages of limestone eventually lead to a reduction in compressive strength. The above test data suggests a true peak in compressive strength at about 3-5% limestone by weight, and noticeable strength improvements at percentages of 3-10%. At a minimum, the test data demonstrates that limestone can be added in significant quantities to GGBFS without any appreciable loss in strength for the slag cement product.

Of course, other performance and quality factors, such as workability, finishability, color and resistance to aggressive chemicals, may dictate a preferred ratio of limestone to GGBFS in a particular application. It is understood that other additives may be combined with the slag cement produced according to this invention where certain physical properties are desired in a particular application.

One embodiment of the present invention contemplates a method for producing a slag cement that comprises the steps of providing a supply of granulated blast furnace slag (GBFS), providing a supply of limestone, combining the GBFS and limestone in a predetermined ratio, and grinding the GBFS and limestone to cement fineness. In a preferred embodiment, the predetermined ratio in the combining step is less than about 15% by weight limestone to GBFS. In a most preferred embodiment, the predetermined ratio is between about 3% and about 5% by weight limestone to GBFS.

In one aspect of this embodiment, the combining step occurs substantially simultaneously with the grinding step. In a more specific aspect, the combining and grinding steps occur in a ball mill.

In another embodiment of the invention, a method for producing slag cement includes the steps of providing a supply of ground granulated blast furnace slag, providing a supply of ground limestone, and mixing the ground constituents in a predetermined ratio effective for use as a cement. The ground constituents are provided at a known cement fineness.

While the invention has been described in detail in the drawings and foregoing description, the same should be considered as illustrative and not restrictive in character. It is understood that only the preferred embodiments have been presented and that all changes, modifications and further applications that come within the spirit of the invention are desired to be protected.

For instance, while the preferred embodiment combines the grinding and mixing of the limestone and the GBFS, each constituent can be separately ground and then mixed in a separate step. In some cases, either constituent or both may be procured already ground to a cement fineness. In that case, combining the limestone and GBFS in a ball mill may not be essential. Instead, the separately ground constituents can be combined in a rotary mill or other blending apparatus.

Furthermore, the present invention contemplates combining ground limestone and GGBFS in a predetermined weight ratio. Other ratios may be acceptable, such as a combination of the constituents by volume ratio. Ultimately, the predetermined ratio of limestone to GGBFS manifests itself in feed rates to the grinding or blending apparatus.

What is claimed is:

1. A method for producing a slag cement comprising the steps of:
   providing a supply of granulated blast furnace slag;
   providing a supply of limestone;
   combining the granulated blast furnace slag and limestone in a ratio of less than about 15% by weight limestone to granulated blast furnace slag; and
   grinding the granulated blast furnace slag and limestone to cement fineness to produce a slag cement consisting essentially of granulated blast furnace slag and limestone.

2. The method for producing a slag cement according to claim 1, wherein the ratio in the combining step is between about 3% and about 5% by weight limestone to granulated blast furnace slag.

3. The method for producing a slag cement according to claim 1, wherein the combining step occurs substantially simultaneously with the grinding step.

4. The method for producing a slag cement according to claim 3, wherein the combining and grinding steps occur in a ball mill.

5. The method for producing a slag cement according to claim 1, wherein the granulated blast furnace slag is dried before the step of combining with limestone.

6. A method for producing a slag cement comprising the steps of:
   providing a supply of granulated blast furnace slag ground to a cement fineness;
   providing a supply of limestone ground to a cement fineness; and
   combining the ground granulated blast furnace slag and ground limestone in a ratio of less than about 15% by weight limestone to granulated blast furnace slag suitable for use as a slag cement consisting essentially of granulated blast furnace slag and limestone.

7. The method for producing a slag cement according to claim 6, wherein the ratio in the combining step is between about 3% and about 5% by weight limestone to granulated blast furnace slag.

8. A slag cement comprising ground granulated blast furnace slag and about 3-15% by weight ground limestone.

9. The slag cement of claim 8, comprising about 3-5% by weight limestone.

* * * * *